United States Patent
Knoblock et al.

(10) Patent No.: US 8,670,617 B2
(45) Date of Patent: Mar. 11, 2014

(54) SYSTEMS AND METHODS FOR LINKING CONTENT TO INDIVIDUAL IMAGE FEATURES

(75) Inventors: Craig A. Knoblock, El Segundo, CA (US); Cyrus Shahabi, Irvine, CA (US); Ching-Chien Chen, Temple City, CA (US); Dipsy Kapoor, Redondo Beach, CA (US)

(73) Assignee: TerraGo Technologies, Inc., Atlanta, GA (US)

( * ) Notice: Subject to any disclaimer, the term of this patent is extended or adjusted under 35 U.S.C. 154(b) by 1111 days.

(21) Appl. No.: 12/152,546

(22) Filed: May 14, 2008

(65) Prior Publication Data

US 2009/0285487 A1  Nov. 19, 2009

(51) Int. Cl.
*G06K 9/46* (2006.01)

(52) U.S. Cl.
USPC ............... 382/190; 382/113; 707/E17.107; 707/E17.11; 707/E17.116

(58) Field of Classification Search
USPC ............... 382/190; 707/E17.107, E17.11, 707/E17.116, E17.117, 999.003, 999.006
See application file for complete search history.

(56) References Cited

U.S. PATENT DOCUMENTS

| | | | |
|---|---|---|---|
| 4,891,761 A | 1/1990 | Gray et al. | |
| 5,546,107 A | 8/1996 | Deretsky et al. | |
| 6,597,818 B2 | 7/2003 | Kumar et al. | |
| 7,660,441 B2 | 2/2010 | Chen et al. | |
| 7,822,751 B2 | 10/2010 | O'Clair et al. | |
| 2001/0036302 A1 | 11/2001 | Miller | |
| 2001/0038718 A1 | 11/2001 | Kumar et al. | |
| 2003/0068071 A1 | 4/2003 | Wilson | |
| 2005/0065959 A1 | 3/2005 | Smith et al. | |
| 2005/0100220 A1 | 5/2005 | Keaton et al. | |
| 2006/0101005 A1* | 5/2006 | Yang et al. | 707/3 |
| 2007/0014488 A1 | 1/2007 | Chen et al. | |
| 2009/0089254 A1 | 4/2009 | Von Kaenel et al. | |
| 2011/0007941 A1 | 1/2011 | Chen et al. | |
| 2011/0119265 A1 | 5/2011 | Shahabi et al. | |
| 2011/0142347 A1 | 6/2011 | Chen et al. | |
| 2011/0280453 A1 | 11/2011 | Chen et al. | |

OTHER PUBLICATIONS

Zhou, Y. et al., Hybrid index structures for location-based web search, CIKM, 2005.
Hariharan, R. et al., Processing Spatial-Keyword (SK) Queries in Geographic Information Retrieval (GIR) Systems, SSDBM, 2007.
De Felipe, I. et al., Keyword Search on Spatial Databases, ICDE, 2008.
Cong, G. et al, Efficient Retrieval of the Top-k Most Relevant Spatial Web Objects, VLDB 2009.
Zhang, D. et al, Keyword Search in Spatial Databases: Towards Searching by Document, ICDE, 2009.
Chen, Y. et al., Efficient query processing in geographic web search engines, SIGMOD, 2006.

(Continued)

*Primary Examiner* — Ruiping Li
(74) *Attorney, Agent, or Firm* — Carr & Ferrell LLP

(57) ABSTRACT

A method, computer program, and system for linking content to individual image features are provided. A section of an image is identified. A plurality of features associated with the section of the image is determined. Each of the plurality of features corresponds to at least one position within the section of the image. Content associated with the plurality of features is retrieved from a content repository. The content is linked to the plurality of features based on at least one rule. The content is then presented.

21 Claims, 7 Drawing Sheets

(56) References Cited

OTHER PUBLICATIONS

Jones, C. B. et al, The SPIRIT Spatial Search Engine: Architecture, Ontologies and Spatial Indexing, GIS, 2004.

Gianinetto et al. "Fusion of Aerial and Satellite Imagery Over the City of Venezia." 2nd GRSS/ISPRS Joint Workshop on Remote Sensing and Data Fusion over Urban Areas, May 22-23, 2003, pp. 216-219.

Martins et al. "Indexing and Ranking in Geo-IR Systems", Proceedings of the 2005 workshop on Geographic information retrieval, pp. 31-34.

Doytsher. "A rubber sheeting algorithm for non-rectangle maps", Computer & Geosciences, 26, 2000.

* cited by examiner

SYSTEMS AND METHODS FOR LINKING CONTENT TO INDIVIDUAL IMAGE FEATURES

GOVERNMENT INTERESTS

The research and development described in this application were supported by the Defense Advanced Research Projects Agency (DARPA) under grant number W31P4Q-07-C-0261 and the Department of Homeland Security (DHS) under grant number N00014-07-01-0149. The U.S. Government has certain rights in the claimed inventions.

BACKGROUND

1. Technical Field

The present invention generally relates to information management. More specifically, the present invention relates to linking content to individual image features.

2. Description of Related Art

Conventionally, prior processing of a document is required if the document is to be correlated to a position on an image. For example, in order to correlate the document and an image containing aerial imagery or a geographical map representation, the document is first searched for keywords or other text that may allude to a physical location. A position on the image containing aerial imagery or a geographical map representation that corresponds to the physical location is determined and the document may be correlated to the position on the image. Unfortunately, an almost infinite number of documents may exist with information about the physical location, which makes obtaining and processing all documents, or documents most pertinent to a specific topic (e.g., news), for the physical location cumbersome.

SUMMARY OF THE INVENTION

A method, computer program, and system for linking content to individual image features are provided. A section of an image is identified. A plurality of features associated with the section of the image is determined. Each of the plurality of features corresponds to at least one position within the section of the image. Content associated with the plurality of features is retrieved from a content repository. The content is linked to the plurality of features based on at least one rule. The content is then presented.

DETAILED DESCRIPTION

Figure 1:
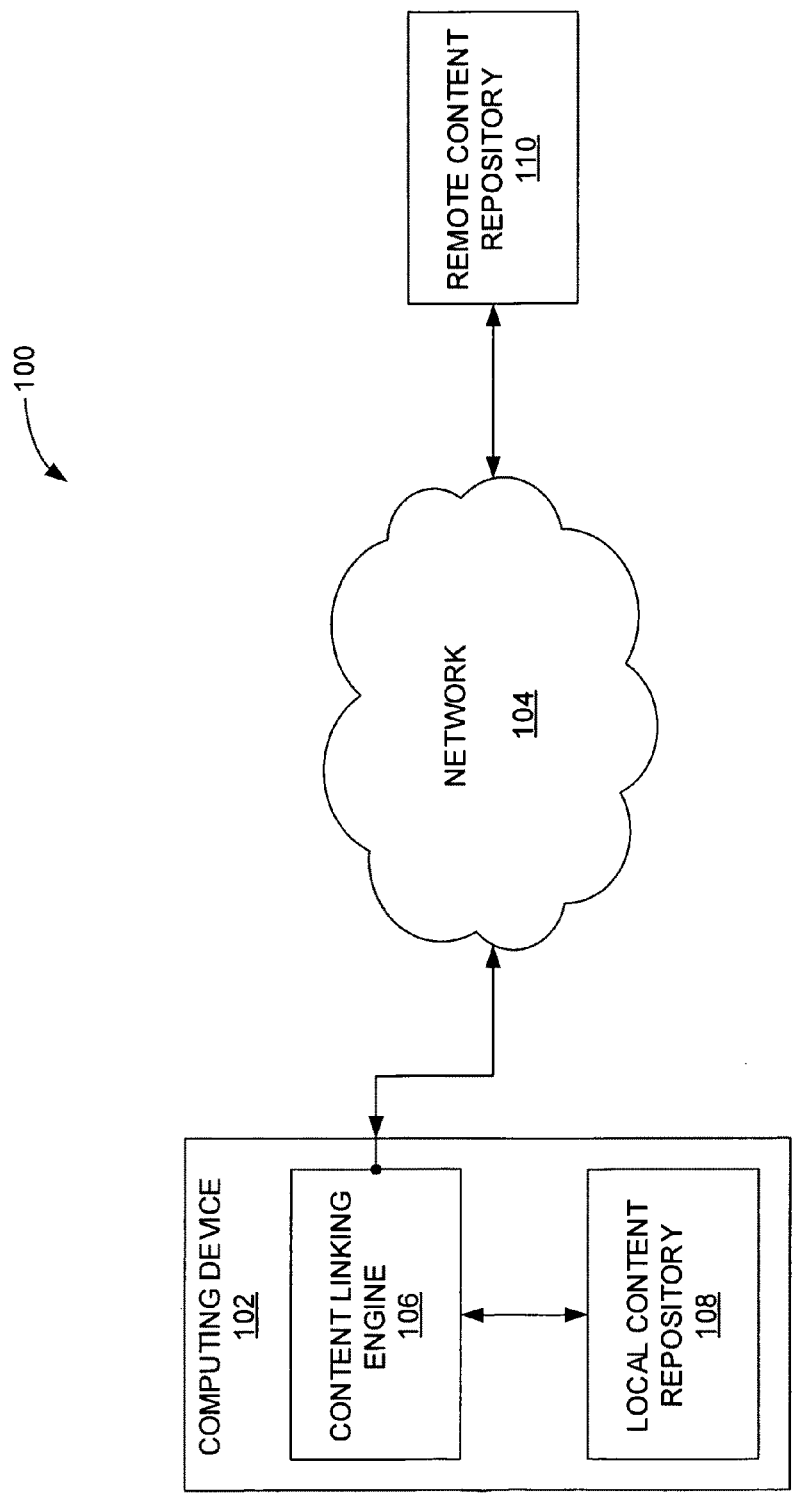
FIG. 1 illustrates an exemplary environment for linking content to individual image features.

FIG. 1 illustrates an exemplary environment 100 for linking content to individual image features. The environment 100 includes a computing device 102 that is in communication with a network 104. The computing device 102 may include a content linking engine 106. In the embodiment illustrated in FIG. 1, the computing device 102 may also include a local content repository 108 that may be accessed by the content linking engine 106. According to various embodiments, the content linking engine 106 may also, or alternatively, access a remote content repository 110 via the network 104. In some embodiments, the environment 100 may include either the local content repository 108 or the remote content repository 110. Although the computing device 102 is discussed herein, any type of device may be utilized for linking content to individual image features in accordance with some embodiments. The computing device 102 may comprise, for example, a desktop personal computer (PC), a laptop PC, a pocket PC, a personal digital assistant (PDA), a smart phone, a cellular phone, a global positioning system (GPS) device, and so on. The computing device 102 may include a permanent memory and/or a temporary memory, as described herein. The network 104 may include, for example, a telecommunications network, a cellular phone network, a local area network (LAN), a wide area network (WAN), an intranet, and the Internet.

According to various embodiments, the local content repository 108 may include a hardware device that may store content. The content and attributes thereof are discussed further herein. In some embodiments, the content may be organized in a database within the local content repository 108. The hardware device may include a non-removable peripheral device (e.g., a hard drive and the like) or a removable peripheral device (e.g., a compact disc, a digital video disc, a USB flash drive, and the like). Generally, the local content repository 108 may be accessed by the content linking engine 106 without transferring the content over the network 104.

The remote content repository 110 may be accessed by the content linking engine 106 by transferring the content over the network 104. The content may be organized in another database within the remote content repository 110, in accordance with some embodiments. In one example, the remote content repository 110 may include hardware devices, similar to the local content repository 108. In another example, the remote content repository 110 may be delocalized. In a delocalized content repository, segments of the content may be stored at dispersed physical locations, each physical location having various methods of storing the content. An example of a delocalized content repository may include the Internet.

According to various embodiments, the remote content repository 110 may be public or private. A public content repository may include, for example, a municipal or public records database. An example of a private content repository may include a business or police database. In some embodiments, the remote content repository 110 may comprise the entire world-wide web or a subset thereof (e.g., a CNN™ website and/or a Google™ news RSS feed).

In one example, the computing device 102 or components thereof may gather the content from the remote content repository 110. Gathered content may be used to build or generate the database within the local content repository 108. In some embodiments, the database may be updated periodically or as new content is produced and/or stored in the remote content repository 110. The database may also include archival content.

In various embodiments, the content, which is stored by the content repositories (e.g., the local content repository 108 and the remote content repository 110) and accessible to the content linking engine 106, may include various forms of information. In one example, the content may include documents such as news articles, police reports, real estate listings, advertisements, manuals, weblogs, and any other primarily text-based item. The content may also include pictures, images, audio media, and video media. In another example, the content may include links or cross-references to third party content, such as hyperlinks or uniform resource locators (URLs). The links may lead to a search page, such as a Yahoo™ or Google™ search page. According to some embodiments, the content may be current (i.e., essentially up-to-date), while in other embodiments, the content may comprise historical information. Further descriptions of the content are present herein.

In an exemplary application of one embodiment, a user may wish to obtain specific content related to particular locations near a position on an image of San Diego. To illustrate, the particular locations may include restaurants and the specific content may include menus or advertisements. The position on the image may correspond to where the user lives. Using the computing device 102 and/or the content linking engine 106, the user may identify the position on the image and supply one or more descriptive words or phrases that delineate the specific content and the particular locations. In turn, the content linking engine 106 may determine and mark the particular locations near the position on the image and retrieve the specific content from the local content repository 108 and/or the remote content repository 110. Finally, the content linking engine 106 may present the specific content to the user.

Figure 2:
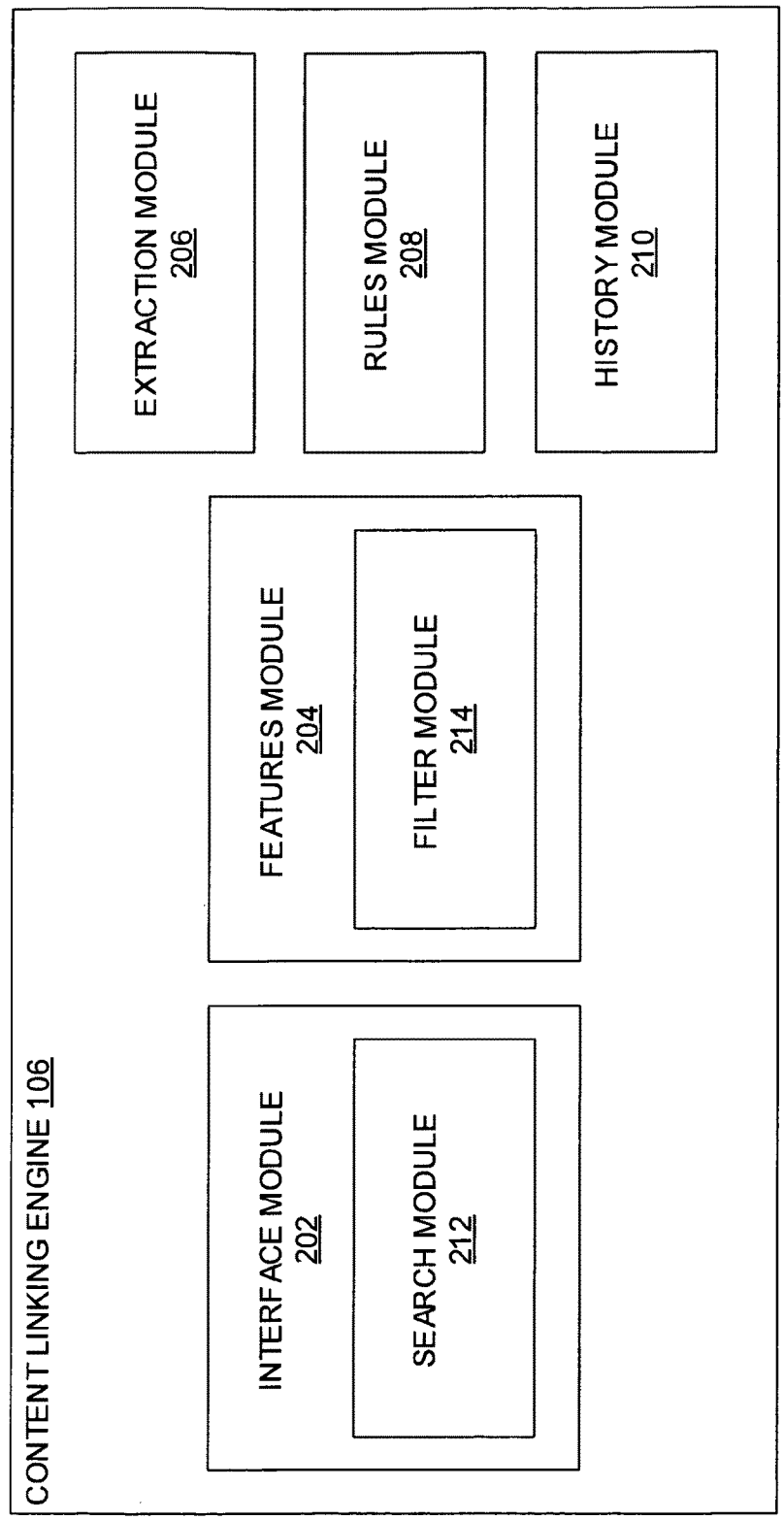
FIG. 2 illustrates an exemplary content linking engine, such as the content linking engine depicted in FIG. 1.

FIG. 2 illustrates an exemplary content linking engine, such as the content linking engine 106 depicted in FIG. 1. The content linking engine 106 may include an interface module 202, a features module 204, an extraction module 206, a rules module 208, and a history module 210. According to the embodiment depicted in FIG. 2, the interface module 202 may include a search module 212, while the features module 204 may include a filter module 214. Although FIG. 2 describes the content linking engine 106 as including various modules, fewer or more modules may comprise the content linking engine 106 and/or any of the various modules comprising the content linking engine 106 and still fall within the scope of various embodiments.

The interface module 202 may provide the user with an ability to interact with and/or manipulate the computing device 102 as well as the features module 204, the extraction module 206, the rules module 208, and/or the history module 210. The interface module 202 may further provide the ability to choose or select an image and identify a section of the image. In one example, the user may define a bounding-box to identify the section of the image. In another example, the user may indicate coordinates that define corners or boundaries of the section of the image. In some embodiments, the section of the image may comprise a portion of the image that is viewable by the user. For example, the section of the image may include the portion of the image that is currently displayed to the user on a screen or monitor in communication with the computing device 102. The interface module 202 is discussed further herein in connection with the features module 204, the extraction module 206, the rules module 208, the history module 210, the search module 212, and/or the filter module 214 as well as in connection with FIG. 5.

In various embodiments, the image may include any likeliness or representation of an object, place, person, or thing that is photographed, painted, or otherwise made visible. In one embodiment, the image may comprise a frame of a video or movie. The image may correspond to a coordinate system, wherein information may be associated with the coordinate system. For instance, an image of a building may correspond to the coordinate system defined by a blueprint of the building. Information pertaining to the building, such as floor plans, wiring, plumbing, fire extinguisher locations, occupant information, hours of business, and so on, may be associated with the coordinate system. The information concerning the building may, for example, be useful to sales people, first responders, and remodelers. Similarly, an image of a piece of machinery comprising several parts may correspond to the coordinate system defined by a mechanical drawing of the piece of machinery. Part numbers, manuals for the parts, part manufactures, and other information related to the piece of machinery may be associated with the coordinate system. Mechanics, merchandisers, and hobbyists, for example, may find the information regarding the piece of machinery useful. In another example, an image of the sky corresponds to the coordinate system to which information related to satellite orbits, constellations, stars, and other heavenly bodies is correlated. Information associated with the image of the sky may be used by astronomers, astrophysicists, meteorologists, and others concerned with aerospace. One skilled in the art will appreciate that the coordinate system may be two- or three-dimensional.

For the sake of continuity in describing various embodiments, an example where the image includes geospatial imagery of an urban area will be revisited throughout. The geospatial imagery may comprise, for example, aerial imagery, satellite imagery, a map, and/or any other spatial representation of a geographic area or region. The geospatial imagery may correspond to a geographical coordinate system, which may specify latitude and longitude coordinates. Parcel data may include road vectors, parcel identifiers, parcel coordinates, schedule numbers, neighborhood names/codes, subdivision names/codes, zoning information, sale histories, property descriptions/inventories, tax information, school districts, information about property owners, or any combination thereof. Furthermore, information comprising the parcel data may be used to obtain further information, such as by an internet search of a specific address. The further information may be associated or combined with the parcel data. The parcel data may describe features portrayed in the geospatial imagery. The features are discussed further herein.

As mentioned herein, the interface module 202 may include the search module 212, in accordance with various embodiments. In one example, the search module 212 may operate based on one or more user-specified search parameters. Furthermore, the section of the image may be identified automatically, for example, by the interface module 202 when the user performs a search of the image. To illustrate, referring to the example wherein the image includes geospatial imagery of the urban area, the user-specified search parameter may, for example, include the word "zoo." Resultantly, the search module 212 may search within the image for a zoo. Providing that the zoo is within the urban area depicted by the image, the interface module 202 may automatically identify the section of the image that includes the zoo. The dimensions of the section of the image may be specified by the user or be defined by a default value, according to various embodiments. The user-specified search parameters may, for example, include addresses, geographical coordinates, parcel descriptions, road names and intersections, and any number of keywords pertaining to the urban area depicted in the geospatial imagery included in the image.

The features module 204 may determine the features associated with the section of the image. Furthermore, the features may correspond to separate positions within the section of the image. In the example where the image includes geospatial imagery of the urban area, the features may include businesses, residences, hospitals, geological features, roads, or any other feature associated with the geospatial image. In determining the features, the features module 204 may rely, in part, on information associated to the geographical coordinate system corresponding to the image. According to various embodiments, a knowledgebase (i.e., a specialized database for knowledge management) may be generated to manage the information associated to the image. In the context of the geospatial imagery, the knowledgebase may be referred to as a geoknowledgebase. Many datasets may also be used to generate the geoknowledgebase, including the parcel data. In addition, gazetteers, such as those available from the United States Geological Survey (USGS), may be used to generate the geoknowledgebase. The gazetteers may include names, addresses, and specific coordinates for certain features. Road vector data may be obtained, for example, from NAVTEQ™ and provide road coordinates and other information (e.g., names, number of lanes, and width) for the geoknowledgebase.

In various embodiments, the features module 204 may determine addresses from the geoknowledgebase. Based on the addresses, the features module 204 may determine information related to the addresses, such as names of businesses/residents and descriptions of buildings located at the addresses. Roads may also be determined as features by the features module 204, for example, using road vectors included in the geoknowledgebase. The features determined by the features module 204 may be stored in the geoknowledgebase. The geoknowledgebase may reside in the permanent and/or temporary memory included in the computing device 102 or in any hardware device that may be accessed by the computing device 102 and/or the content linking engine 106 via the communication network 104, in accordance with various embodiments. Additionally, the section of the image identified in conjunction with the interface module 202 may delimit a spatial query of the geoknowledgebase such that only the features within the section of the image are determined by the features module 204.

In various embodiments, the features module 204 may accurately determine the features when the geographical coordinate system is aligned with the image. In the example involving the geospatial imagery, the geographical coordinate system defined by the geoknowledgebase may be aligned with the geospatial imagery. Alignment of the geoknowledgebase with the geospatial imagery may ensure that depictions of the features on the image correspond to actual physical locations of the features. The alignment of any coordinate system with a corresponding image may be equally applicable in embodiments other than those involving the geospatial imagery and the geoknowledgebase.

The geoknowledgebase may define a spatial extent of some or all of the features, according to some embodiments. To illustrate, the spatial extent of the features may include points, lines, polygons, and/or three-dimensional shapes. In one example, the spatial extent of a road may comprise a line, whereas a point may be the spatial extent of an intersection. A polygon, such as a rectangle, may define the spatial extent of a building. The interface module 202 may specify the features in a way more representative or descriptive of the actual features as a result of defining the spatial extent.

The interface module 202 may specify the features determined by the features module 204 in a multitude of ways. In one example, the features may be marked by an icon that is overlaid on the image at the position that corresponds to the positions of the features. The appearance of the icon may, for example, be related to a characteristic or associated topic of the features. For instance, referring to the example where the image includes geospatial imagery, if a given feature determined by the features module 204 is a fire station, the icon may portray a fireman's hat and be located on the image at the position corresponding to the address of the fire station.

In another example of ways in which the interface module 202 may specify the features, elements of the image corresponding to the features determined by the features module 204 may be outlined, highlighted, or otherwise accentuated by the interface module 202. Accentuation of the features may be based on the spatial extent of the features. For instance, again referring to the example where the image includes geospatial imagery, one feature determined by the features module 204 may be a road. The element of the image corresponding to the road (e.g., a grouping of pixels that portray the road in the image) may be replaced, for example, by a red line. Furthermore, text describing the name of the road may be positioned adjacent to the red line.

As mentioned herein, the features module 204 may include the filter module 214. The filter module 214 may aid the user in narrowing the number of and/or scope of the features determined by the features module 204. In one embodiment, the filter module 214 may operate based on one or more user-specified filter parameters. In one example, the user-specified filter parameter may designate "businesses owned by residents," such that only businesses that are owned by residents within the section of the image may be determined by the features module 204. In another example, the user-specified filter parameter may indicate "homes sold in May for less than $150,000." Consequentially, only features that satisfy the conditions indicated by the user-specified filter parameter within the section of the image may be determined by the features module 204.

The extraction module 206 may retrieve the content that is associated with the features from a content repository, such as the local content repository 108 and/or the remote content repository 110. The features determined by the features module 204 may be used, for example, as keywords in searching for the content. In one example, the extraction module 206 may search the text of the documents stored by the remote content repository 110 and retrieve the documents that are associated with the features based on the results of the search. In another example, the content may be assigned an index. In such a case, the extraction module 206 may retrieve content based on the index. Additionally, foreign language content may be retrieved.

Various media (e.g., pictures, images, audio, and video) may comprise the content retrieved by the extraction module 206 in some embodiments. For example, speech recognition software may be used to convert speech included in an audio file to text that may be searched by the extraction module 206. Likewise, closed-captions of a video file may also be searched for the keywords. Additionally, header files of the various media may be searched by the extraction module 206. The extraction module 206 may determine a type of the content and, for example, retrieve the content based on the type.

The rules module 208 may link the content retrieved by the extraction module 206 to the features determined by the features module 204 based on a set of rules. The set of rules may be predefined, such as by a system designer, and/or established by the user. The interface module 202 may be utilized by the user to manipulate the rules module 208, as mentioned herein. In some embodiments, the set of rules may be based, in part, on the type of the content retrieved by the extraction module 206.

In one example, a single document associated with the content may include references to several of the features in the section of the image. The rules module 208 may determine whether one of the features is most relevant to the single document based on the set of rules. The rules module 208 may then link the single document to the most relevant feature. Many rubrics may be used in determining which one of the features is most relevant to the single document. For instance, a priority may be based on the spatial extent of the features referenced in the single document. To illustrate, a point-like spatial extent may have a higher priority than a linear or a polygonal spatial extent.

The rules module 208 may also order the content according to relevance considering that the extraction module 206 may retrieve numerous documents comprising the content that all include references to a single feature. The rules module 208 may determine the relevance of each of the numerous documents and order the numerous documents according to the relevance. The rules module 208 may, for example, link the most relevant document or a range of relevant documents (e.g., the ten most relevant documents) to the feature.

The interface module 202 may present the content subsequently, concurrently, or prior to the content being linked to the features by the rules module 208. In one example, the content may be presented along with the section of the image. The content may be presented separately, for example, in an internet browser window. In another example, the content may be printed to a hardcopy by a printer. According to some embodiments, the interface module 202 may wait for an action by the user before presenting the content.

An interaction between the user and the icon or the accentuated feature may be an example of the action by the user. In one example, the user may use a mouse to "click" on the icon to cause the interface module 202 to present the content. In another example, the user may move the cursor over the accentuated feature (i.e., a "mouseover") in order to display the content. In an embodiment where the computing device 102 is portable (e.g. a PDA or Smartphone), the user may, for example, select the icon using a stylus or a finger. As one skilled in the art will acknowledge, the action by the user may initiate, prompt, or otherwise affect a variety of functions, processes, tasks, or other actions by various embodiments.

In association with the interaction between the user and the icon or the accentuated feature, the interface module 202 may provide various options. In one example, a balloon may emanate from the features offering one or more options to the user, as described further herein. The options may include, for example, how to present the content associated with the features. In another example, the content associated with the features may appear in a frame separate from the interface module 202, such as an internet browser window.

According to various embodiments, the history module 210 may provide, to the user, a record of activities performed by the user. Examples of the record of the activities performed by the user may include the sections of the images that have been viewed and the searches that have been performed, such as in a list format. In some embodiments, the record may span a predetermined length of time. To illustrate, the record may indicate the activities performed by the user in the last week.

The history module 210 may provide to the user a record of content retrieved by the extraction module 206. The record may, for example, be stored by the computing device 102, as described in connection with FIG. 6. According to various embodiments, the record may be presented to the user by the interface module 202 in an assortment of formats, as discussed further in connection to FIG. 5.

Figure 3:
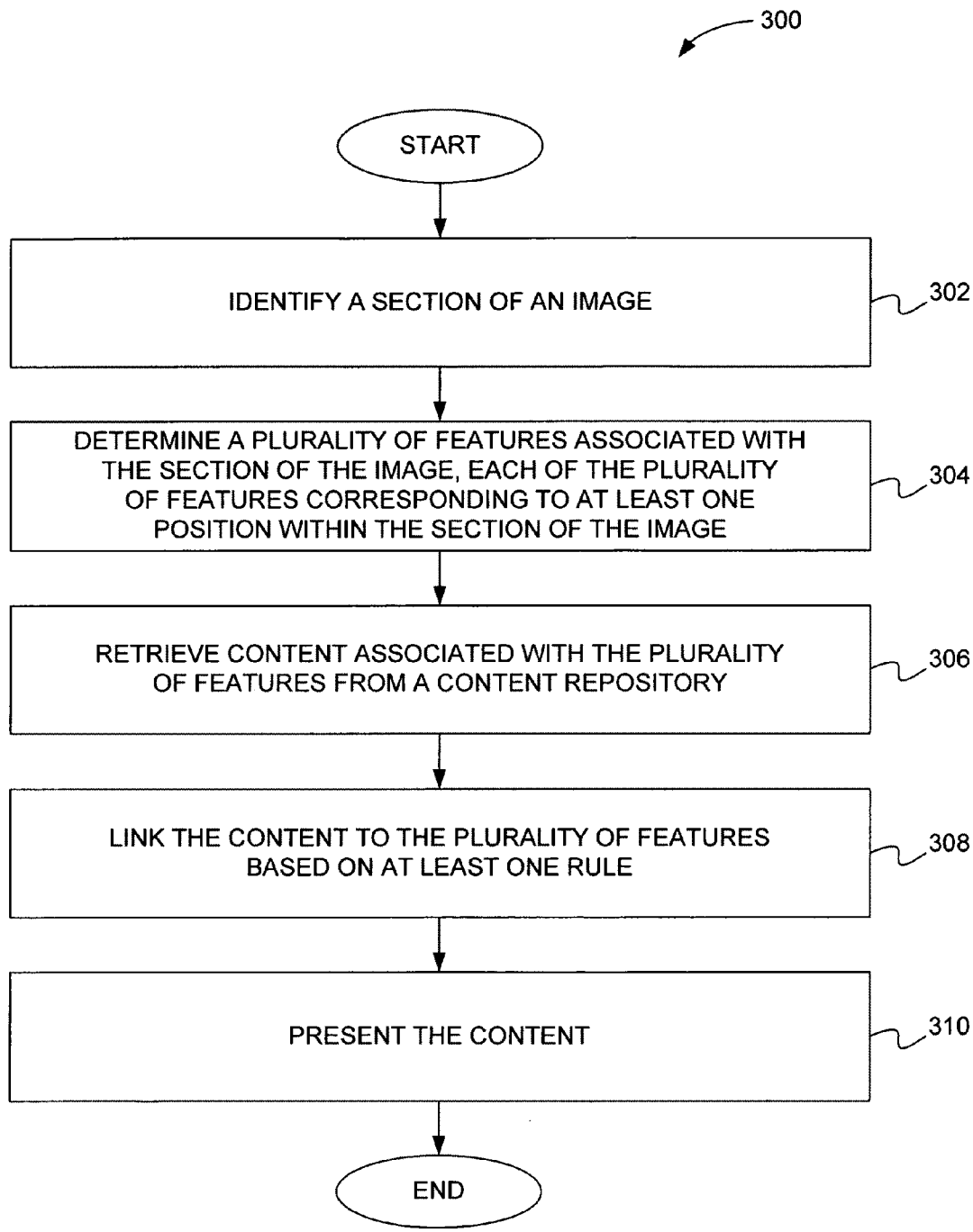
FIG. 3 illustrates a flowchart showing an exemplary process for linking content to individual image features.

FIG. 3 illustrates a flowchart showing an exemplary process 300 for linking content to individual image features. According to various embodiments, the process 300 may be carried out by the content linking engine 106, the computing device 102, any other device, or any combination thereof.

At step 302, a section of an image is identified. As discussed herein, the image may include any representation of an object, place, person, or thing. For example, the image may include a likeness of the object or the person. The image may include items that are photographed, painted, or otherwise made visible. The user may be provided the ability to identify the section of the image by, for example, the interface module 202. The section of the image may be identified by a bounding-box, coordinates that define the boundaries of the section, or automatically by the interface module 202, according to various embodiments. In one example, the section of the image may comprise the portion of the image that is currently presented to the user on a screen or monitor. In some embodiments, the section of the image may be determined in part by the use of a search procedure, such as may be provided by the search module 212.

At step 304, a plurality of features associated with the section of the image is determined. Furthermore, each of the plurality of features may correspond to at least one position within the section of the image. The plurality of features may be determined, for example, by the features module 204. As discussed herein, information regarding the plurality of features may be embedded in the image or stored elsewhere. The plurality of features may be specified by the interface module 202 according to various means, such as by highlighting one or more of the plurality of features or overlaying an icon on the image at the position of the one or more the plurality of features. In some embodiments, the plurality of features may be determined in part by the use of a filter procedure, such as may be provided by the filter module 214.

At step 306, content is retrieved from a content repository, wherein the content is associated with the plurality of features determined at the step 304. As discussed herein, the extraction module 206 may retrieve the content that is associated with the plurality of features from the local content repository 108 and/or the remote content repository 110.

At step 308, the content is linked to the plurality of features based on at least one rule. In exemplary embodiments, the rules module 208 may link the content to the plurality of features base on at least one rule. Numerous rules may be invoked by the rules module 208 in linking the content, such as rules based on the type of the content and/or the spatial extent of the features.

At step 310, the content is presented. For example, the content may be presented to the user that requests the search for the plurality of features or by any other user. The content may be utilized to generate a report associated with one or more of the plurality of features, such as a report about a location on a map, according to exemplary embodiments. As discussed herein, the interface module 202 may facilitate presenting the content. Presentation of the content is described further herein in connection to FIGS. 4A, 4B, and 5.

In another exemplary application of various embodiments, the user may possess an image of a map representing Kansas City. The image may be displayed on the monitor in communication with the computing device 102. The user may identify the section of the image that contains a potential real estate acquisition by positioning the bounding-box around the section using a mouse coupled to the computing device 102 in conjunction with the interface module 202. The section of the image may expand to fill the display. The user-specified filter parameter may include the phrase "police reports for incidents in the last six months." Based on the user-specified filter parameter, the features module 204 may determine the features, such as the residences and the businesses, within the section of the image that are associated with police reports for incidents in the last six months. The interface module 202 may place a colored dot on each position on the section of the image that corresponds to the features. In turn, the extraction module 206 may retrieve the police reports from the police database and store the police reports in the local content repository 108. The rules module 208 may then link the most relevant police reports to the features. By clicking on each colored dot, the interface module 202 may present a relevant police report associated with an individual feature to the user, as described herein.

Figure 4A:
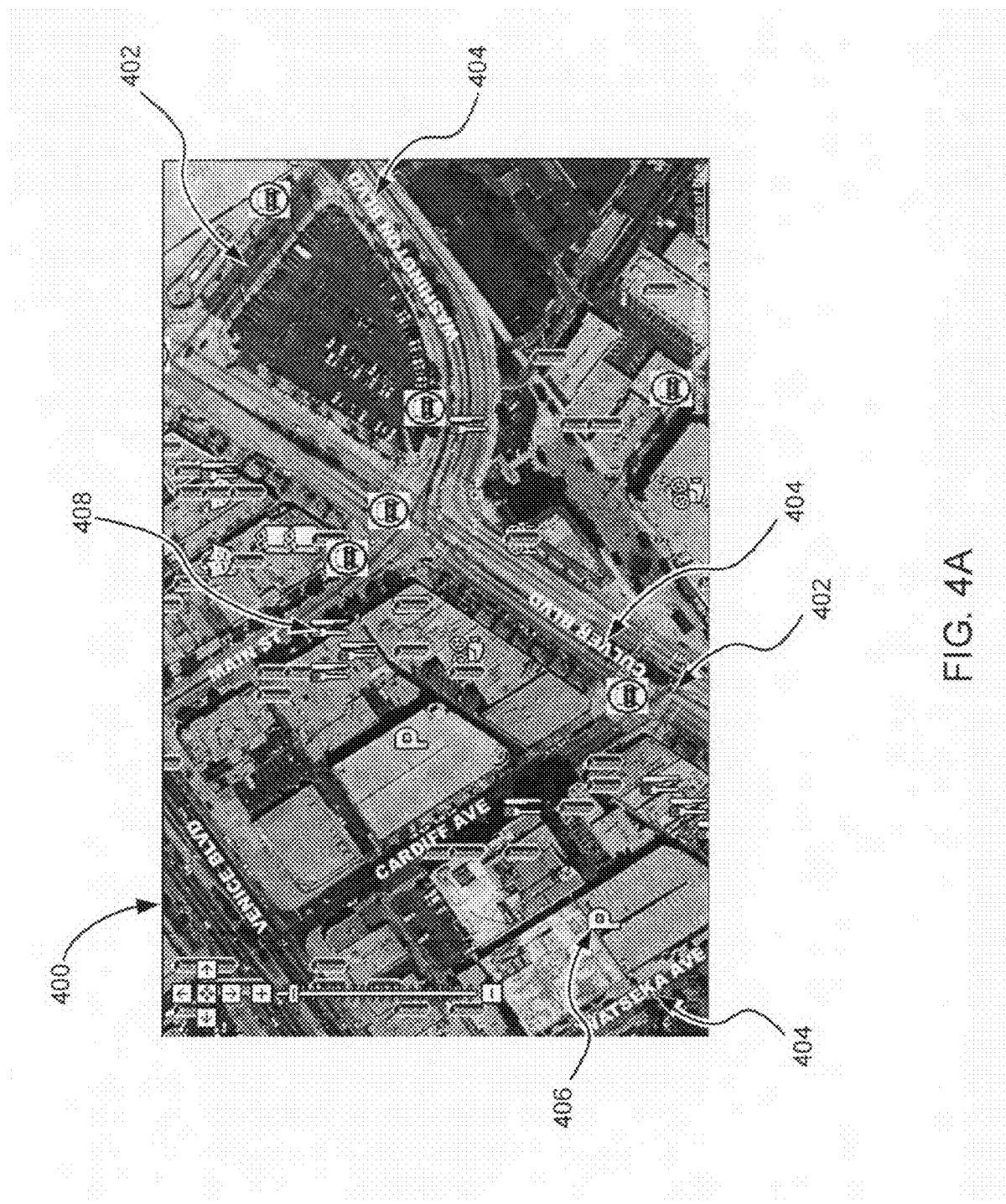
FIGS. 4A and 4B illustrate an exemplary section of an image that includes features to which the content may be linked.
Figure 4B:
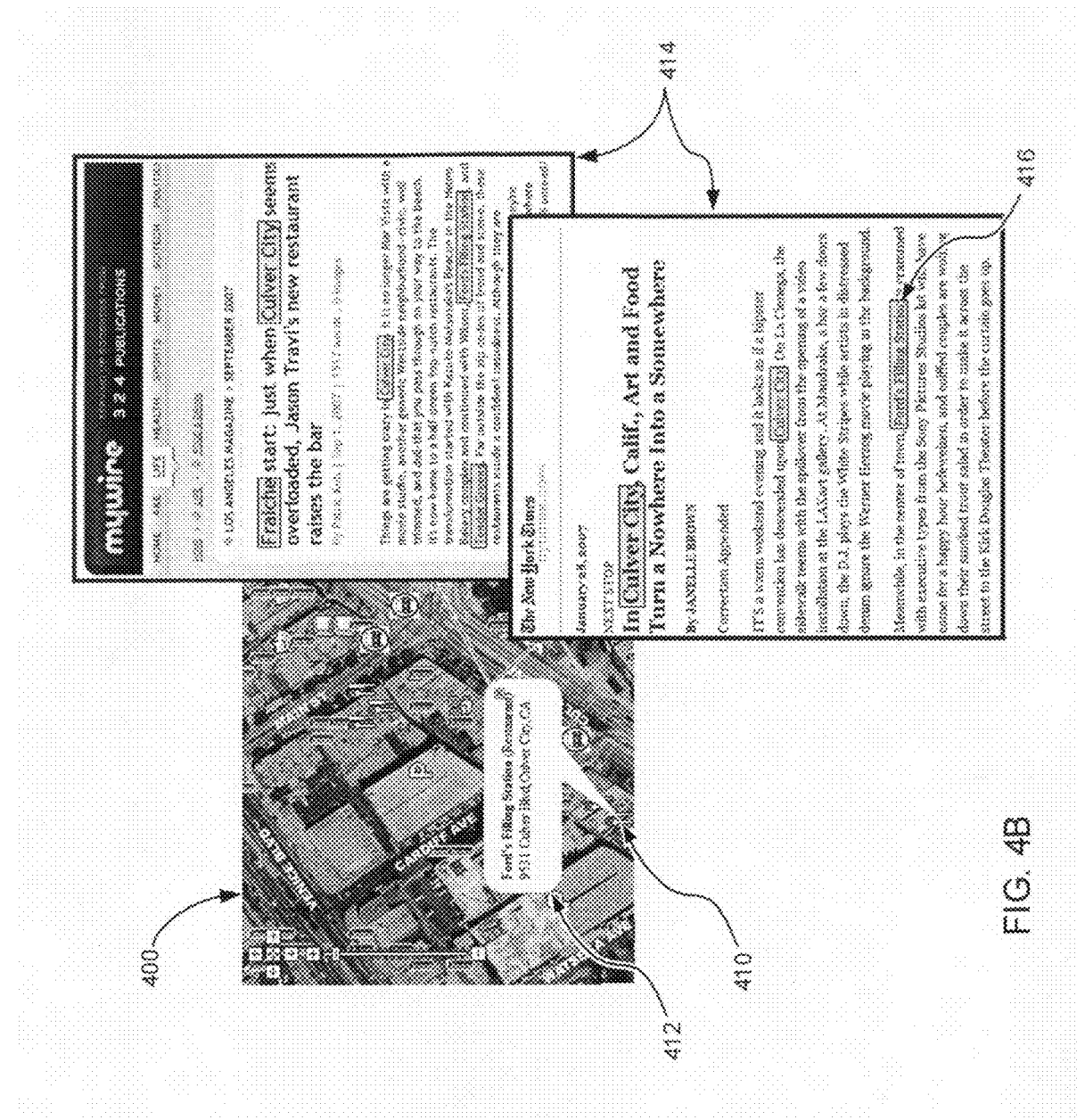

FIGS. 4A and 4B illustrate an exemplary section 400 of an image that includes features to which the content may be linked. The section 400 includes geospatial imagery of an urban area. According to various embodiments, the user may identify the section 400 by defining a bounding-box or coordinates that define the boundaries of the section using the interface module 202, or by any other method. The interface module 202 may identify the section 400 automatically in conjunction with the search module 212, according to some embodiments.

FIG. 4A illustrates an example of features associated with the section 400 of the image determined by the features module 204. In this example, roads are accentuated by lines, such as road line 402. Text, such as road text 404, may be positioned near or on some of the roads. Additionally, text may be used to label regions (not shown) of the geospatial imagery including cities, counties, states, countries, and so on. Several features are marked by icons, such as parking icon 406 and eatery icon 408, by the interface module 202. In this depiction, many icons may have different appearances based on the feature marked (e.g., restaurants and eateries, parking facilities, shopping facilities, playhouses, and movie theatres) or the content linked to the features.

FIG. 4B illustrates an example of the content linked to a feature marked by an icon 410 in the section 400 of the image. A balloon 412 emanates from the icon 410. In this example, the text contained by the balloon 412 may describe a name and physical location or address of the feature marked by the icon 410. Furthermore, a description of the type of the feature is indicated within the balloon 412 by a parenthetical word. The balloon 412 may appear subsequent to the features module 204 identifying the feature and the rules module 208 linking the content retrieved by the extraction module 206. In other embodiments, the balloon 412 may appear in response to the action of the user (e.g., clicking on the icon). One skilled in the art will appreciate that a balloon, such as the balloon 412, or equivalent thereof (i.e., text provided in any format), may contain a variety of text, pictures, or other methods of communication (e.g., audio and video) in accordance with various embodiments.

In some embodiments, the content associated with the feature and linked to the icon 410, such as news documents 414, may include text-based documents. In the example presented in FIG. 4B, the news documents 414 include news articles related to the physical location of the feature marked by the icon 410. According to one embodiment, the content may have been retrieved by the extraction module 206 from the local content repository 108 and/or the remote content repository 110 based on a keyword, such as keyword 416.

Figure 5:
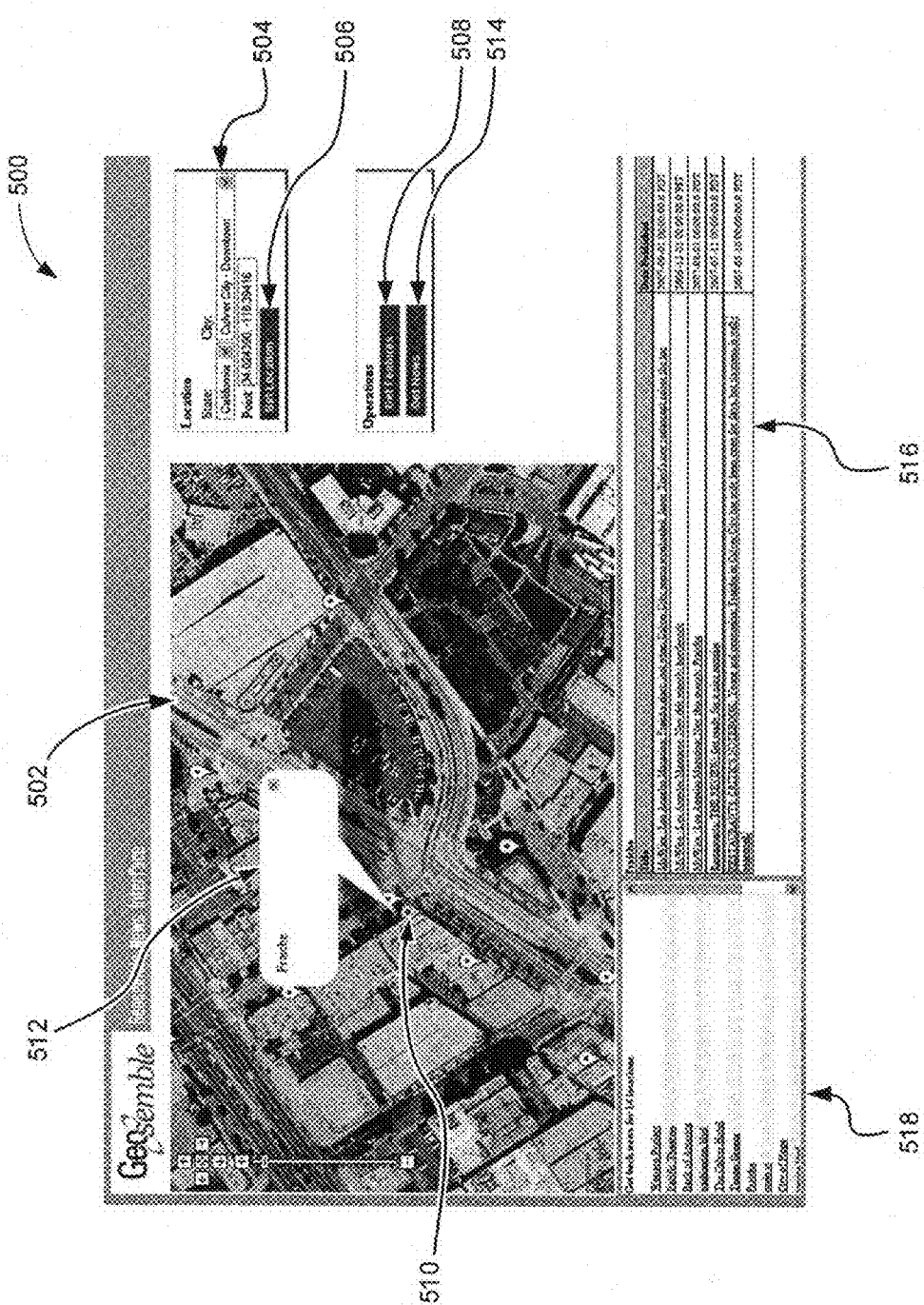
FIG. 5 shows a screenshot illustrating an exemplary interface module.

FIG. 5 shows a screenshot 500 illustrating an exemplary interface module, such as the interface module 202. The screenshot 500 includes a section 502 of an image, a location field 504, a Set Location icon 506, a Get Features icon 508, a feature marking icon 510, a text balloon 512, a Get News icon 514, a content information list 516, and a features-with-content list 518. According to some embodiments, the interface module illustrated by the screenshot 500 may facilitate the user's ability to interact with and/or manipulate the content linking engine 106 and the computing device 102, as discussed further herein.

In the screenshot 500, the section 502 may be identified automatically by the interface module 202 in conjunction with the search module 212, according to various embodiments. The location field 504 may facilitate the user in manipulating the search module 212. In the example illustrated by screenshot 500, the user may specify a city, a state, and/or coordinates (e.g., geographical or image coordinates). Furthermore, the user may specify a region within the city (e.g., downtown). In one example, the user may instruct or prompt the search module 212 to proceed with a search for a location by clicking on the Set Location icon 506. In another example, the user may optionally not invoke the search module 212 and rather identify the section 502 by making a section of interest visible in the interface module 202. In some embodiments, the user may manipulate a view of the image using a pointing device, such as the mouse the coupled to the computing device 102.

Subsequent to the section 502 of the image being identified, the features module 204 may determine features associated with the section 502, where the features correspond to at least one position within the section 502. In some embodiments, the features may be determined in response to the user clicking the Get Features icon 508. In other embodiments, the features module 204 may be configured to determine the features immediately after the section 502 is identified. In one example, the features module 204 determines the features in conjunction with the filter module 214 (not shown in FIG. 5). In the screenshot 500, a plurality of icons, each similar to the feature marking icon 510, may mark the features. According to various embodiments, a portion of the features within the section 502 may be marked by icons, while the remaining features may be accentuated as described herein.

By emanating from the feature marking icon 510, the text balloon 512 may indicate that the feature marking icon 510 has been selected by the user. As mentioned herein, the user may select an icon or feature by a variety of actions by the user. According to some embodiments, the function of the text balloon 512 may be replaced, for example, by a "pop-up" window or other prompt to the user.

The extraction module 206 may retrieve content associated with the features from a content repository (e.g., the local content repository 108 and/or the remote content repository 110). In one example, the extraction module 206 may retrieve content in response to the user clicking the Get News icon 514. In this example, the extraction module 206 may be configured to retrieve content that is related to news associated with the features.

Subsequent to the content being retrieved by the extraction module 206, the rules module 208 may link the content to the features, as described herein. According to various embodiments, information related to the content that is associated with a selected icon, such as the feature marking icon 510, may be displayed in the content information list 516. In the screenshot 500, the information includes a title and a date published of the content that is associated with the selected icon. In some embodiments, the information may include category, type, source, number of views, or other description of the content associated with the selected icon.

The features-with-content list 518 indicates the features that the extraction module 206 has retrieved associated content for, in accordance with some embodiments. In one example, the user may click the name of one of the features indicated by the features-with-content list 518 to change which feature is designated as the selected feature, thereby changing which feature the text balloon 512 emanates from and which information is displayed in the content information list 516.

As discussed herein, the content may be displayed by the interface module 202 or be displayed separately, such as by an internet browser window, according to various embodiments. The user may, for example, click on one of the titles displayed in the content information list 516 to view the content associated with the feature marked by the feature marking icon 510.

Figure 6:
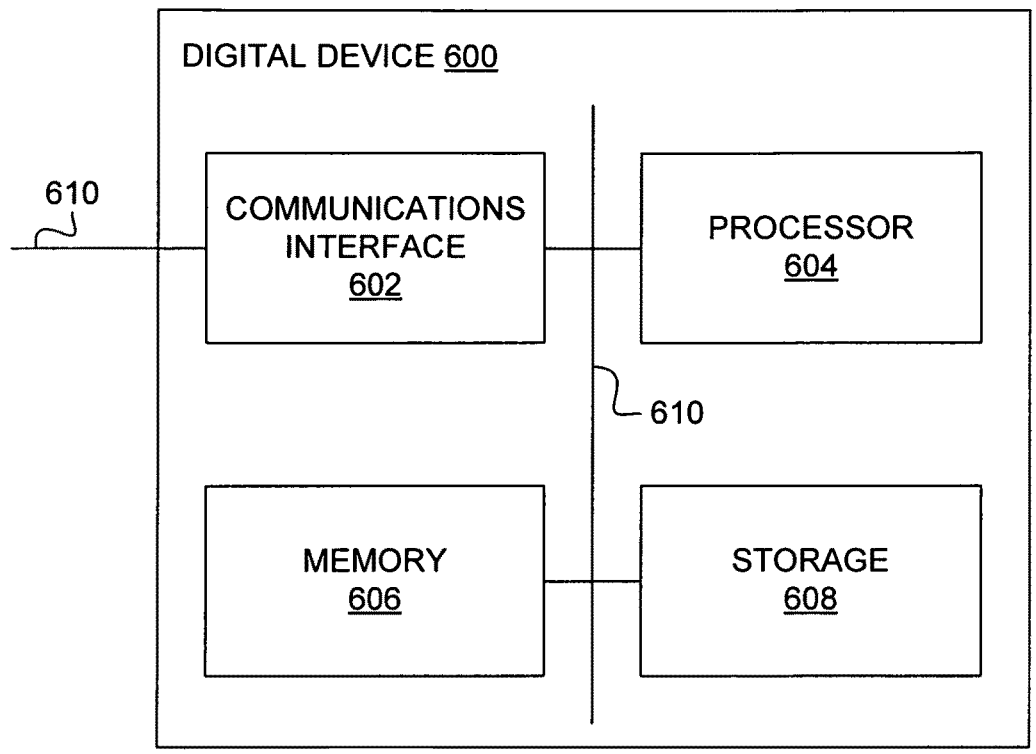
FIG. 6 shows an exemplary digital device.

FIG. 6 shows an exemplary digital device 600. The digital device 600 may comprise the content linking engine 106 or the computing device 102, according to some embodiments. The digital device 600 comprises at least a communications interface 602, a processor 604, a memory 606, and storage 608, which are all coupled to a bus 610. The bus 610 provides communication between the communications interface 602, the processor 604, the memory 606, and the storage 608. The communications interface 602 provides communication between the digital device 600 and a network, such as the network 104. The processor 604 executes instructions. The memory 606 permanently or temporarily stores data. The memory 606 may include the local content repository 108. Some examples of memory 606 are RAM and ROM. The storage 608 also permanently or temporarily stores data. The storage 608 may also include the local content repository 108. Some examples of the storage 608 are hard disks and disk drives.

The above-described components and functions can be comprised of instructions that are stored on a computer-readable storage medium. The instructions can be retrieved and executed by a processor (e.g., the processor 604). Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
   receiving an identification of a section of an image;
   determining a plurality of features included in a geoknowledgebase that are associated with the section of the image, each of the plurality of features in the geoknowledgebase corresponding to at least one position in the geoknowledgebase that is within the section of the image;
   determining information in the geoknowledgebase related to the at least one position corresponding to each of the plurality of features;
   extracting the related information from the geoknowledgebase for use as keywords in searching a content repository;
   searching content in the content repository for the keywords to identify content comprising descriptions of the determined plurality of features;
   retrieving, via a computing device, content that includes the keywords from the content repository, wherein the retrieved content comprises video, and wherein speech recognition software is used to convert speech included in an audio file of the video to text for searching using an extraction module;
   linking the retrieved content to the determined plurality of features;
   filtering the plurality of features associated with the identified section of the image based on a user-specified filter parameter to select at least one feature that satisfies conditions indicated by the user-specified filter parameter, using a filter module; and
   presenting content linked to the at least one feature selected from the determined plurality of features.

2. The method of claim 1, further comprising determining a spatial extent of each of the plurality of features and aligning a coordinate system of each of the features in the geoknowledgebase with the coordinate system of the image.

3. The method of claim 2, wherein the extracted keywords are the features.

4. The method of claim 1, further comprising selecting the at least one feature using a rule based on a type of the content.

5. The method of claim 1, wherein the image is a frame of a video, and an alignment of the features is based on the geoknowledgebase.

6. The method of claim 1, further comprising marking at least one of the plurality of features with at least one icon.

7. The method of claim 6, wherein the appearance of the at least one icon is based on a characteristic of the content or the plurality of features.

8. A non-transitory computer readable storage medium having embodied thereon a program, the program being executable by a processor for performing a method, the method comprising:
   receiving an identification of a section of an image comprising features;
   delimiting a spatial query of a geoknowledgebase to only those features within the section of the image;
   determining a plurality of features from the delimited query of the geoknowledgebase, the plurality of features corresponding to at least one position within the section of the image;
   using the determined plurality of features as keywords for searching content in a content repository for occurrences of the keywords;
   assigning content to an index in the content repository;
   searching content in the content repository for occurrences of keywords in the content using the index;
   retrieving content from the content repository based on the index, the retrieved content including at least one occurrence of the keywords, wherein the retrieved content comprises video, and wherein speech recognition software is used to convert speech included in an audio file of the video to text for searching using an extraction module;
   linking the retrieved content to the plurality of features;
   presenting content that has been linked to at least one of the plurality of features associated with the section of the image;
   filtering the plurality of features associated with the identified section of the image based on a user-specified filter parameter to select at least one feature that satisfies conditions indicated by the user-specified filter parameter, using a filter module; and
   presenting an indication of the linking of at least one feature to the presented content.

9. The computer readable storage medium of claim 8, further comprising determining a spatial extent of each of the plurality of features.

10. The computer readable storage medium of claim 9, further comprising linking the retrieved content to the plurality of features, based on at least one rule, the at least one rule is based on the spatial extent.

11. The computer readable storage medium of claim 8, further comprising determining a type of the content.

12. The computer readable storage medium of claim 11, wherein the section of the image is a floor plan of a building and the type of the content is plumbing, the features of the building being aligned with a geographical coordinate system defined by a geoknowledgebase such that depictions of the features in the section of the image correspond to actual physical locations of the features.

13. The computer readable storage medium of claim 8, wherein the geoknowledgebase includes a plurality of datasets, and determining the plurality of features is based on features described by parcel data included in a parcel dataset of the geoknowledgebase.

14. The computer readable storage medium of claim 8, further comprising marking at least one of the plurality of features with at least one icon.

15. The computer readable storage medium of claim 14, wherein the appearance of the at least one icon is based on a characteristic of the content or the plurality of features.

16. A system comprising:
an interface module configured to receive an identification of a section of an image;
a features module configured to determine a plurality of features included in a geoknowledgebase that are associated with the section of the image, each of the plurality of features in the geoknowledgebase corresponding to at least one position included in the geoknowledgebase, the at least one position being within the section of the image, such that only features including a position within the section of the image are determined by the features module;
a filter module configured to reduce a number of features determined by the features module using filter parameters received from a user such that only features that satisfy conditions indicated by the filter parameters and within the section of the image may be determined by the features module, and wherein the features module is further configured to determine a spatial extent of each of the plurality of features;
an extraction module configured to use the determined plurality of features as keywords to search documents stored in a content repository, and to retrieve content from the content repository, the retrieved content including one or more keywords and comprising a description of features portrayed in the section of the image, wherein the content retrieved by the extraction module comprises video, and wherein speech recognition software is used to convert speech included in an audio file of the video to text for searching using the extraction module;
a rules module configured to determine a link between each of the retrieved content and each of the plurality of features based on at least one rule; and
the interface module further configured to present at least one content and linked feature.

17. The system of claim 16, wherein the section of the image is a blueprint of a building and the at least one rule is based on the spatial extent of features in the blueprint.

18. The system of claim 16, wherein the image is a frame of a video and the extraction module is further configured to determine a type of the content of the video.

19. The system of claim 16, wherein the features module is further configured to determine the plurality of features based on features described by parcel data included in a parcel dataset of the geoknowledgebase.

20. The system of claim 16, wherein the interface module is further configured to mark at least one of the plurality of features with at least one icon.

21. The system of claim 20, wherein the appearance of the at least one icon is based on a characteristic of the content or the plurality of features.

* * * * *